Jan. 27, 1970  J. M. MUSGRAVE  3,492,020
STEP ASSEMBLY FOR CAMPER
Filed Dec. 26, 1967  2 Sheets-Sheet 1
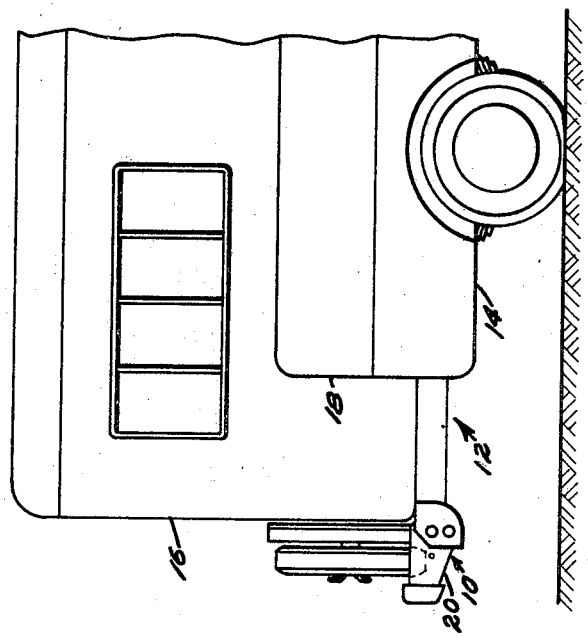
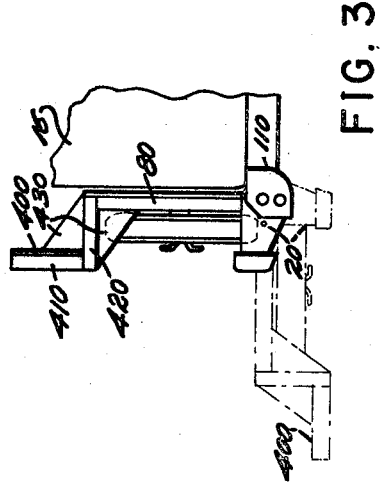
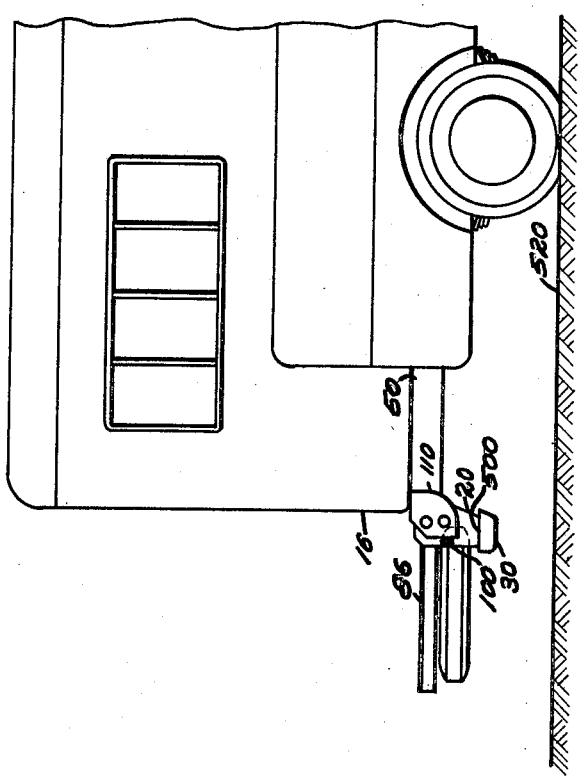
INVENTOR.
JOHN M. MUSGRAVE

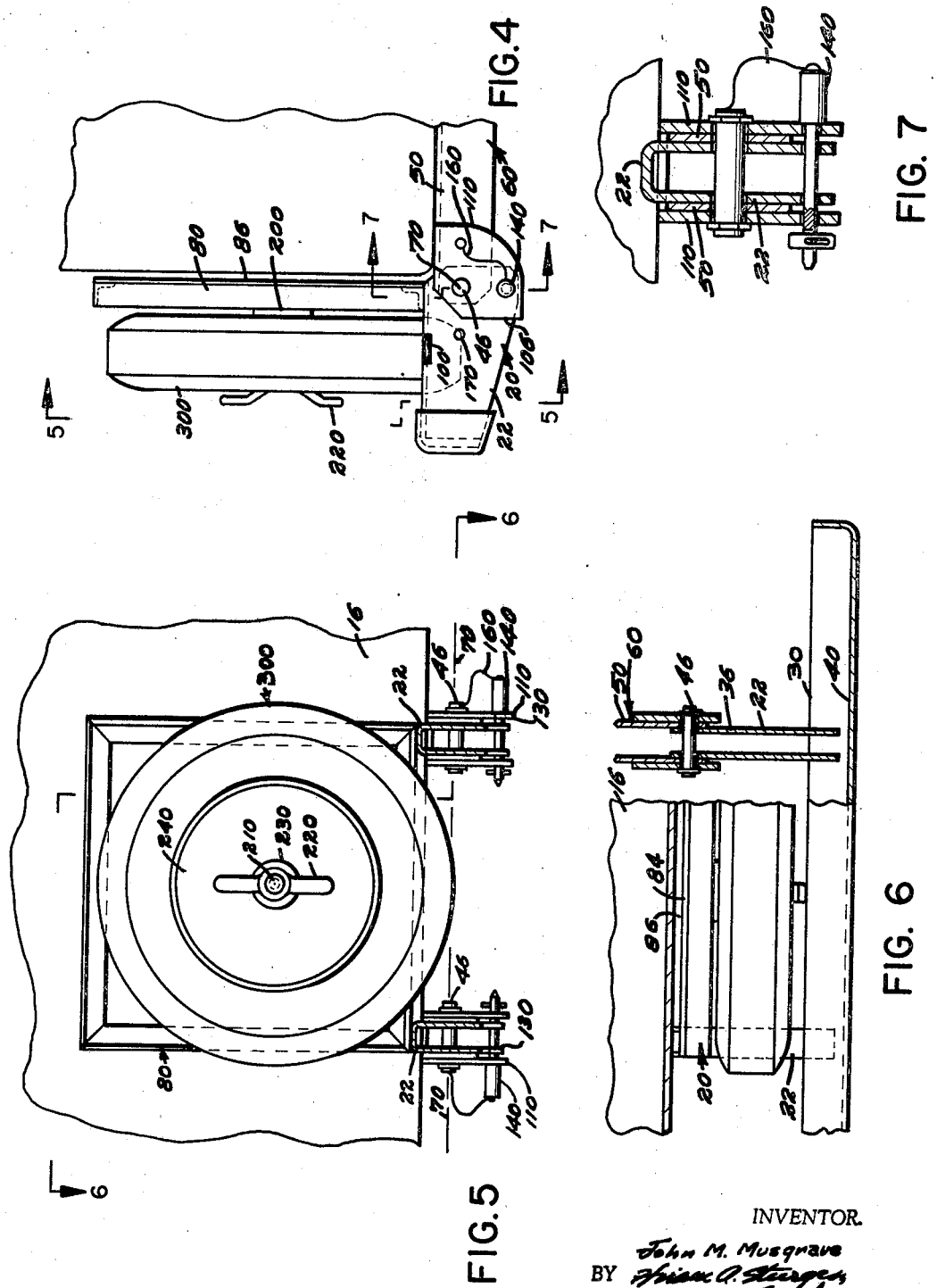

United States Patent Office 3,492,020
Patented Jan. 27, 1970

3,492,020
STEP ASSEMBLY FOR CAMPER
John M. Musgrave, Woodbine, Iowa 51579
Filed Dec. 26, 1967, Ser. No. 693,557
Int. Cl. B60r 3/00
U.S. Cl. 280—166       3 Claims

ABSTRACT OF THE DISCLOSURE

A combination step assembly and spare wheel mounting assembly for attachment to the rearward side of a truck mounted camper in which the step assembly and the spare wheel are both disposed forwardly of and protected by a bumper.

FIELD OF THE INVENTION

The problem of carrying a spare tire on a truck mounted camper has never been adequately solved. If such a tire were placed on the rearward side of the camper, it would be in the way of the camper door, and if mounted on the camper door, it would interfere with opening the door, further complicated by the factor that such doors are never strong enough for this purpose.

In consequence, spare tires have been stored under the rearward end of the pickup truck on which the camper is mounted. This position is very inaccessible and can only be reached by crawling under the part of the camper that laps over the rearward end of the truck and under the rearward end of the truck itself. When a driver is attempting to remove a spare wheel from storage in this position, he is often in great danger.

The spare wheel is usually only ten inches from the ground and a flat tire on the truck puts the frame of the truck down so close to the ground that the frame of the truck is itself almost on the ground, and yet a person must crawl under the frame. As this can only be done when the truck is jacked up, there is great danger lest the suction caused by a passing semi-trailer along a highway might cause the truck to rock off of its jack pinning the operator between the frame and the ground.

The inaccessibility of the conventional spare tire storage position is a special handicap for the many persons of retired age who have time to vacation and who would like to be able to use a pickup truck mounted camper.

Another problem is that many campers do not have bumpers and these are legally optional in most states, but are obviously very useful and necessary to prevent destruction of a relatively fragile camper in the event of collision.

DESCRIPTION OF THE PRIOR ART

A bumper has been mounted heretofore at the rear of a camper and on channels bolted to the longitudinal frame members of a pickup truck. But such bumpers have been rigid and are not adapted to pivot and do not serve any of the extra purposes achieved by the similar parts of this invention.

The channels supporting such bumpers as heretofore marketed have not been adjustable and have been adapted to fit only one situation in which the back end of a camper is of a single specific distance from the back end of a pickup truck.

A further problem of the prior art has been the inconvenience of stepping from ground level up to the level of the bottom of a camper door, a distance which is usually approximately twenty-one inches, whereas the convention convenient height of a step on a household stairway is only seven inches.

SUMMARY OF THE INVENTION

It is, therefore, an object to provide a bumper frame which is attached pivotally to the rearward ends of connecting members connecting the bumper frame to the longitudinal frame members of the pickup truck, and in which the bumper frame has a normally upright tire-supporting assembly attached thereto and adapted to support a spare tire on its normally rearward side, the upper side of the tire support serving as a step when in a horizontal position to facilitate entrance through the camper rear door by a person approaching it at ground level, and means normally holding the bumper frame in an upper position and releasable for permitting the bumper frame to swing downwardly to dispose the upper side of the tire-supporting assembly in a horizontal position for use as a step.

BRIEF DESCRIPTION OF THE DRAWING

FIGURE 1 is a side elevation of the rearward end of a camper and pickup truck assembly shown with the step assembly of this invention in a folded or road-traveling position thereon.

FIGURE 2 is a view similar to FIGURE 1 showing the step assembly of this invention in a downward position for use as a step and permitting access to the rear door of the camper.

FIGURE 3 is a detail showing a modification of the step assembly in which an extra step is attached thereto.

FIGURE 4 is an enlarged detail of the step assembly shown in side elevation.

FIGURE 5 is a sectional view taken along the line 5—5 of FIGURE 4.

FIGURE 6 is a sectional view taken along the line 6—6 of FIGURE 5.

FIGURE 7 is a sectional view taken along the line 7—7 of FIGURE 4.

The step assembly of this invention is generally indicated at 10 in FIGURE 1 and is shown as mounted on the rearward end of a camper and pickup truck assembly generally indicated at 12, which latter is composed of a pickup truck 14 having an inhabitable camper 16 mounted in its bed and projecting from the rearward side 18 of the truck.

The step assembly 10 has a frame 20, best seen in FIGURES 4 and 6, and having two rearwardly extending parallel elongated frame mebers 22 to the rearward end of which a bumper 30 is secured, the bumper 30 extending horizontally.

The frame 20 has a normally forward side 36 and a normally rearward side 40. The forward end of each of the frame members 22 is pivotally connected by means of a respective one of two pins 46 to the rearward end of a respective one of two forwardly extending connecting members 50 which form parts of a connecting assembly generally indicated at 60, and later described, which has as its purpose the attachment of the frame 20 to the longitudinal frame members of the underside of the pickup truck 14, Since the pivot pins 46 are horizontally disposed and in alignment, they define a horizontal pivot axis transverse to the truck 14, the said pivot axis being shown at 70, in FIGURE 5.

A step support generally indicated at 80 is attached at its lower side to the upper sides of the respective frame members 22, as best seen in FIGURE 5, and has on its upper side a suitable covering 84 which has a stepping surface 86 which is disposed forwardly at times when the frame 20 is in a normal position for road travel, as seen in FIGURE 4, and which is disposed horizontally when in a position for use as a step, as shown in FIGURE 2.

As best seen in FIGURE 2, limit members 100 can be attached to the outer side of each of the frame members 22 in positions for engaging the rearward side 106 of respective ones of two position-control members 110, which latter are suitably attached rigidly to the rearward ends of the respective connecting members 150 and are disposed on the outer sides thereof with the rearward edges 106 so positioned with respect to the pivot axis 70 that the limit members or limit blocks 100 engages the rearward sides 106 during the lowering of the rearward end of the frame 20 at exactly the point in which the stepping surface 86 has become horizontal, as seen in FIGURE 2.

The positioning members 110 each have an opening 130 extending therethrough for receiving a removable pin 140 which extends also through suitable openings in the frame members 22 so that at a time when the step support 80 is in its upper position for road travel, the pins 140 will tend to hold it in the said upper position with the stepping surface 86 vertical.

The pins 140 are prevented from becoming lost by attachment to the connecting members 110 by suitable flexible attachment assembly 160, best seen in FIGURE 4.

The frame members 22 can also have openings 170 extending horizontally therethrough and positioned for receiving the respective pins 140 at times when the frame 20 is in a lowered position above-described, so that if desired, the camper can be driven with the step in the downward position.

Referring to FIGURE 4, it will be seen that on the normally rearward side of the step support 80, a wheel rim engaging member 200 is provided and secured to the step support 80 and has rearwardly extending from it a bolt 210 having a hand-operated wing nut 220 attached to it having a hub 230 of a size for spanning the opening at the center of a wheel rim 240, as is conventional.

As best seen in FIGURE 5, the frame members 22 are spaced apart sufficiently to permit a substantial part of the wheel assembly 300 of a conventional pickup truck to extend downwardly therebetween so as to reduce the total height of the position of the wheel assembly 300 when it is in vertical road travel position.

Referring now to FIGURE 3, a modification of the invention is there shown in which a second and lower stepping surface 400 is provided in a position so as to be horizontally disposed when the frame 20 is in the lower position, as shown in dotted lines, the stepping surface 400 being disposed on the upper side of the second stepping surface support means generally indicated at 410 and which is attached to the step support 80 by means of a second step support connection frame 420 which depends downwardly from the step support 80 when the latter is in a horizontal position and braced by suitable flange means 430.

It will be seen, however, that the normally forward side 500 of the bumper 30 is shown to be in an approximately horizontal position, as seen in FIGURE 2, when the frame 20 is in the lower position whereby the normally forward side 500 of the bumper 30 serves as an alternate second stepping means in between the ground 520 and the level of the stepping surface 86.

I claim:
1. In combination: a frame having a forward side and a rearward side, elongated connecting means disposed on and extending forwardly from the forward side of said frame and adapted to be attached to the conventional longitudinal frame members of the underside of a pickup truck, means pivotally connecting the forward side of said frame to the rearward end of said connecting means for rotation of said frame about a horizontal axis whereby the rearward end of said frame can swing downwardly about said axis from an upper travel position to a lower position, a step support attached to the upper side of said frame, a stepping surface on the forward side of said step support when said frame is in said upper position, said stepping surface being horizontally disposed at times when said frame is in said power position, said stepping surface being disposed in a substantially vertical position when said frame is in an upper storage position for travel, said frame and said connecting means forming a mounting assembly and defining two general parts thereof, limit means operatively correlated with said frame and said connecting means and attached to one of said two general parts and disposed in a position for permitting said frame to swing downwardly at its rearward end with respect to said connecting means until said stepping surface is in a horizontal position and also disposed for limiting pivoting of said frame so as to maintain said stepping surface in a horizontal position when said frame is in said lower position, and in which a spare wheel mounting means is attached to the rear side of said step support for removably supporting a spare wheel in a vertical position.

2. The combination of claim 1 in further combination with bumper means attached to the rearward side of said frame when said step is in an upper position, said bumper means having substantial length from the right to the left ends thereof and having substantial strength so as to provide a substitute for a conventionally mounted pick-up truck bumper.

3. The combination of claim 1 in further combination with a truck having truck frame, a camper on said truck and extending beyond the rearward end of said truck, said elongated connecting means extending under the rearward side of said camper and being connected to the frame of said truck.

References Cited

UNITED STATES PATENTS 2,991,118    7/1961    Sleger _____ 280—166

LEO FRIAGLIA, Primary Examiner

R. R. SONG, Assistant Examiner